United States Patent [19]

Köblitz et al.

[11] Patent Number: 4,722,192
[45] Date of Patent: Feb. 2, 1988

[54] METHOD OF AND APPARATUS FOR CHECKING THE ICING OF EVAPORATORS IN REFRIGERATION SYSTEMS

[75] Inventors: Thomas Köblitz; Hellmuth Lange, both of Varel, Fed. Rep. of Germany

[73] Assignee: A. Heinen GmbH Maschinenfabrik, Varel, Fed. Rep. of Germany

[21] Appl. No.: 64,826

[22] Filed: Jun. 19, 1987

[30] Foreign Application Priority Data

Jul. 30, 1986 [DE] Fed. Rep. of Germany ....... 3625762

[51] Int. Cl.⁴ .............................................. F25D 21/00
[52] U.S. Cl. ............................................ 62/80; 62/283
[58] Field of Search ...................... 62/272, 93, 94, 281, 62/283, 284, 80

[56] References Cited

U.S. PATENT DOCUMENTS

| | | | |
|---|---|---|---|
| 2,943,460 | 7/1960 | Brown | 62/272 |
| 3,012,407 | 12/1961 | Burrows | 62/272 |
| 4,513,577 | 4/1985 | Wilson et al. | 62/281 |

*Primary Examiner*—Henry A. Bennet
*Attorney, Agent, or Firm*—Peter K. Kontler

[57] ABSTRACT

The icing of the evaporator for refrigerant in a refrigeration system is checked by an air-permeable web of wire mesh which is moved along an endless path extending in front of the inlet of the evaporator to collect moisture from the flow of atmospheric air which is conveyed into the evaporator. Successive increments of the web are thereupon regenerated by melting or mechanically removing the ice and frost and by thereupon drying and cooling the increments before they return into the portion of the endless path in front of the inlet of the evaporator. Cooling of the web can be effected in a discrete cooling device or by causing a portion of the path to extend behind the outlet of the evaporator so that the web is cooled by cool atmospheric air which leaves the evaporator. The moisture-collecting action of the web can be enhanced by causing several successive portions of the path to extend in front of the inlet of the evaporator so that moisture-containing atmospheric air must repeatedly penetrate through the interstices of the web before it enters the evaporator.

26 Claims, 4 Drawing Figures

METHOD OF AND APPARATUS FOR CHECKING THE ICING OF EVAPORATORS IN REFRIGERATION SYSTEMS

BACKGROUND OF THE INVENTION

The invention relates to refrigeration systems in general, and more particularly to evaporators in which cooling is produced by evaporation of a liquid refrigerant. Still more particularly, the invention relates to improvements in methods of and in apparatus for checking the icing of evaporators in refrigeration systems.

The deposition of frost and ice on evaporators of refrigeration systems is a well known and highly undesirable phenomenon. The surface of the evaporator collects moisture from the flow of air which is admitted into or is forced to enter the inlet or inlets of the evaporator so that the inlet or inlets are covered with ice and/or frost within hours. This necessitates a defrosting, a procedure which normally involves an interruption of operation of the refrigeration system. Numerous proposals were made to delay the icing and frosting of the evaporator and to thus prolong the intervals of operation of the refrigeration system. Deicing or defrosting is desirable on the additional ground that the output of the evaporator and the efficiency of the refrigeration system decrease with progressing icing of the inlet or inlets of the evaporator.

One presently known proposal is disclosed in German Pat. No. 117,943 according to which the flow of air which is to enter the evaporator is caused to pass through hygroscopic salts. Such proposal is not satisfactory in modern refrigeration plants wherein large quantities of hygroscopic material would have to be kept close to the evaporator in order to prevent or delay the icing.

German Offenlegungsschrift No. 1,551,332 proposes to employ an evaporator which is provided with external ribs or fins and to place an array of smooth-surfaced pipes in front of the evaporator. Moisture is supposed to deposit on the surfaces of the pipes. The pipes delay the icing of the evaporator and exhibit the advantage that ice can be more readily removed from their smooth surfaces than from the ribbed or finned surface or surfaces of the evaporator. However, the effectiveness of the array of pipes is not entirely satisfactory and, though it is simpler and easier to remove ice and frost from smooth-surfaced pipes, such operation is far from being simple and invariably takes up a rather long interval of time during which the refrigeration system remains idle.

European Pat. No. 0 089 991 proposes to place a blower in front of the inlet of an evaporator and to install a filter between the blower and the inlet so that the filter gathers moisture and thus delays the icing of the evaporator. This proposal exhibits the drawback of the proposal which is disclosed in the German Offenlegungsschrift. All of the above-enumerated prior proposals share the drawback that they can merely delay the icing and only for relatively short intervals of time.

OBJECTS AND SUMMARY OF THE INVENTION

An object of the invention is to provide a novel and improved method of checking the icing or frosting of evaporators in refrigeration plants in such a way that the intervals of satisfactory operation are much longer than in refrigeration plants wherein the icing or frosting of evaporators is delayed in accordance with heretofore known proposals.

Another object of the invention is to provide a method which can be practiced in connection with existing refrigeration systems to check the icing or frosting of conventional evaporators.

A further object of the invention is to provide a method which can be resorted to for more or less intensive checking of the icing or frosting of evaporators, depending on the length of intervals during which the evaporator should operate at full capacity.

An additional object of the invention is to provide a refrigeration system wherein the icing or frosting of the evaporator is checked in a novel and improved way.

Still another object of the invention is to provide the refrigeration system with novel and improved means for effectively preventing or for greatly delaying the deposition of ice and frost on the evaporator.

A further object of the invention is to provide a deicing or defrosting unit which can be installed in existing refrigeration systems and which can be designed to effectively prevent or at least delay the icing or frosting of the evaporator for periods of time which are several times longer than the periods of effectiveness of heretofore known deicing or defrosting units.

Another object of the invention is to provide a deicing or defrosting unit which can be relieved of accumulated frozen moisture without necessitating even a short-lasting interruption of operation of the refrigeration system.

One feature of the present invention resides in the provision of a method of checking (i.e., preventing or delaying) the icing of the evaporator for refrigerant (e.g., Freon) in a refrigeration system wherein the evaporator has inlet means for admission of a flow of atmospheric air and such air normally or often contains moisture which tends to deposit in or on and causes rapid icing or frosting of the evaporator. The method comprises the steps of conveying across the flow of atmospheric air in front of the inlet means of the evaporator a moisture-collecting air-permeable body which collects at least some moisture from the flow while the flow passes through the body and into the inlet means whereby the collected moisture tends to freeze on the body (such tendency is due to the fact that the body is preferably cooled ahead of the inlet means of the evaporator), and regenerating the moisture-laden body by relieving it of frozen and/or liquid moisture so that it can be conveyed in front of the inlet means.

The conveying step can include advancing the body along an endless path having a first portion in front of the inlet means of the evaporator and at least one second portion downstream of the first portion. The regenerating step is carried out in the second portion of the path. Such regenerating step can include defrosting and cooling the body, drying and cooling the body or defrosting, drying and cooling the body. The defrosting step can include melting frozen moisture off the body. Alternatively, or in addition to melting, the defrosting step can include mechanically and/or pneumatically segregating moisture (including frost) from the body.

The body can be cooled prior to again reaching the inlet means of the evaporator by moving first in front of the inlet means where it collects moisture, thereupon through the regenerating zone or zones where it is relieved of moisture and dried, and thereupon behind the outlet means of the evaporator where the cooled flow of atmospheric air is permitted or caused to escape so that the flow of cooled atmospheric air cools the body before the latter reaches the inlet means. The body can constitute a web of foraminous material, e.g., fine wire mesh.

Another feature of the present invention resides in the provision of a refrigeration system which comprises an evaporator for refrigerant. The evaporator has inlet means for admission of a flow of atmospheric air which normally contains moisture tending to cause icing or frosting of the evaporator, and means for checking (preventing or delaying) the icing or frosting of the evaporator. The checking means comprises an air-permeable moisture-collecting body which is movable across the flow of air in front of the inlet means of the evaporator whereby the body collects at least some moisture from the flow while the flow passes through it and into the inlet means. The collected moisture tends to freeze on the body and, therefore, the checking means further comprises means for regenerating the moisture-laden body, i.e., means for restoring the ability of the body to collect moisture. The body can include a web of foraminous material, e.g., a mesh or screen of fine wire whereby the wire can constitute a network of tubes wherein a suitable fluid coolant is circulated, if necessary.

The refrigerator system preferably further comprises conveyor means for advancing the body along an endless path having a first portion in front of the inlet means of the evaporator and a second portion downstream of the first portion as seen in the direction of advancement of the body. The regenerating means is adjacent the second portion of the path. The entire body can constitute an endless web of wire mesh or the like.

The regenerating means can include means for melting frozen moisture (e.g., moisture in the form of hoarfrost) off the body and/or means for mechanically removing frost from the body. Such removing means can comprise one or more brushes, e.g., two rotary cylindrical brushes which are disposed at opposite sides of the second portion of the path for the body and scrape or strip frost off the component parts of the body. The removing means can further comprise one or more nozzles or other suitable means for directing against the body at least one jet of a compressed gaseous fluid which removes moisture from the body, e.g., by melting it and/or by acting mechanically upon the component parts of the body.

The regenerating means can comprise means for removing at least some moisture (in a liquid and/or solid state) from the body and means for thereupon drying the body in order to remove the remnants of moisture. Still further, the regenerating means can comprise means for cooling the body before it returns into the first portion of the path so that the cooled body is more suited for deposition of moisture on its surface or surfaces. Such cooling means can follow the melting or other moisture removing and drying means. It will be noted that the regenerating means can include a succession of units or assemblies which are adjacent the second portion of the path for the body and are disposed one after the other at required intervals and in an optimum sequence, preferably in such a way that one-stage or multi-stage removal of at least some moisture is followed by drying to remove or expel the remnants of moisture, and the drying operation is followed by a cooling of successive increments of the body before such increments reenter the first portion of the path in front of the inlet means of the evaporator.

If an even more reliable collection of a relatively large percentage of moisture is desired or necessary, the path for the advancing body can be selected in such a way that a first portion of the path is located in front of the inlet means of the evaporator and an immediately or closely preceding or following second portion of the path is located between the first portion of the path and the inlet means so that the flow of atmospheric air first passes through the body in the first portion and thereupon passes through the body (which already carries some moisture) in the second portion of the path. The regenerating means is then adjacent a third portion of the path downstream of the second portion and upstream of the first portion.

The construction of the regenerating means can be simplified by omitting the cooling means. This can be achieved by selecting the path for the moisture-collecting body in such a way that a first portion of the path is located in front of the inlet means of the evaporator, that a second portion of the path is adjacent a melting device and/or one or more means for mechanically removing moisture from the body, and that a third portion of the path is adjacent the outlet means where the cooled flow of air leaves the evaporator so that the flow of air lowers the temperature of successive increments of the body before such increments reenter the first portion of the path.

Means is preferably provided for guiding the body along the endless path, and such guiding means can comprise at least one rail and one or more chains which are guided by the rail and are connected with the body.

The novel features which are considered as characteristic of the invention are set forth in particular in the appended claims. The improved refrigerating system itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
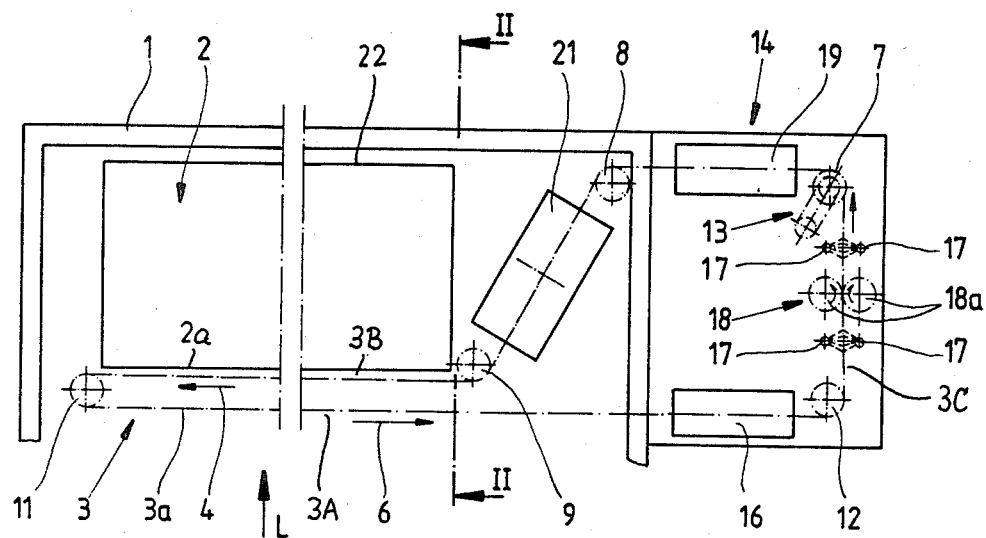
FIG. 1 is a schematic plan view of a refrigeration system which is equipped with a deicing or defrosting apparatus embodying one form of the invention and having a regenerating unit with a discrete cooling device for the moisture-collecting body.
Figure 2:
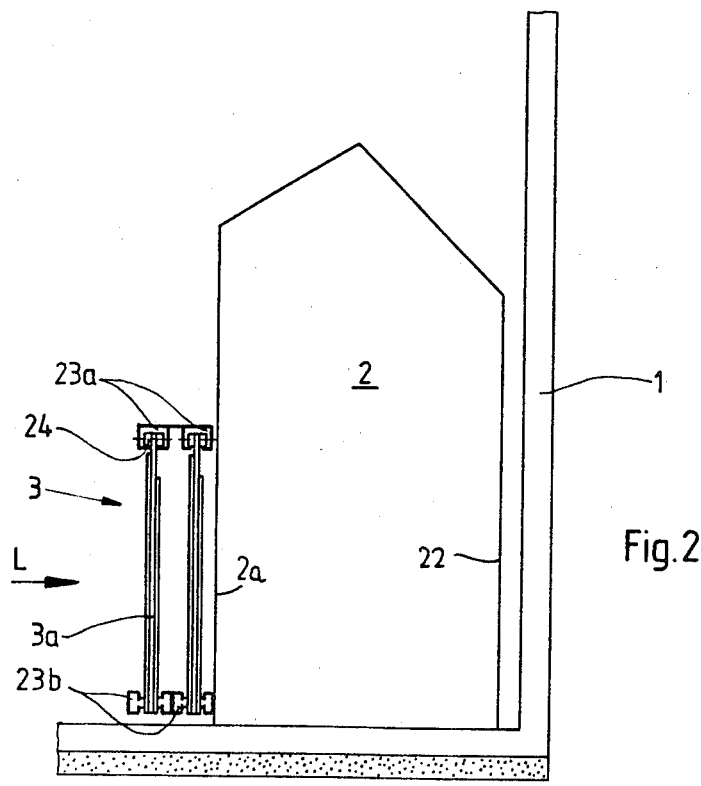
FIG. 2 is a vertical sectional view as seen in the direction of arrows form the line II—II of FIG. 1.

Referring first to FIGS. 1 and 2, there is shown a portion of a refrigeration system with an evaporator 2 which is partially confined in an insulating housing 1. The exact construction of the evaporator 2 forms no part of the invention; the evaporator can comprise coils for a liquid refrigerant and has an inlet (at 2a) for admission of a flow L of atmospheric air through the open side of the housing 1. The outlet 22 of the evaporator 2 is or can be located opposite the inlet 2a and serves to allow for escape of the cooled flow.

The refrigeration system of FIGS. 1 and 2 further comprises an apparatus for checking the icing or frosting of the evaporator 2 as a result of contact with moisture-containing atmospheric air which forms the flow L. Under ideal circumstances, the checking will involve complete prevention of deposition of ice or frost on the evaporator 2; at the very least, the checking involves a pronounced delay of icing or frosting so that the refrigeration system can be used effectively for long intervals of time without the need to deice or defrost the evaporator 2.

The checking apparatus comprises an elongated flexible body 3a of air-permeable moisture-collecting material, such as a web of fine wire mesh having a width which at least matches or even exceeds the height of the inlet 2a of the evaporator 2. The apparatus further comprises means 23a, 23b for guiding the body or web 3a along an endless path 3 in directions indicated by arrows 4 and 6. The path 3 has a first portion 3A which is located in front of the inlet 2a and extends across the flow L of moist atmospheric air, a second portion 3B which is located between the portion 3A and the inlet 2a, and a third portion 3C downstream of the portion 3B but upstream of the portion 3A. The guiding means which defines the path 3 includes guide rails 23a, 23b and pulleys 7, 8, 9, 11 and 12 which are mounted in the main frame of the refrigeration system. The conveyor means for advancing the body or web 3a along the endless path 3 in the direction indicated by arrows 4 and 6 includes a motor-driven toothed belt 13 which transmits torque to the pulley 7.

The means for checking the icing or frosting of the evaporator 2 further comprises a regenerating unit 14 which acts upon successive increments of the advancing web 3a and removes ice and frost therefrom so that the thus treated increments are again ready to collect moisture during travel along the portions 3A and 3B of the path 3. The portions 3A, 3B can be said to constitute two sections of a composite first portion of the path 3. The regenerating unit 14 is adjacent the portion 3C of the endless path 3 and, in the embodiment which is shown in FIGS. 1 and 2, comprises a first deicing or defrosting device 16 (e.g., a chamber which is filled with hot air or contains one or more electric heaters), a second deicing or defrosting device which comprises two nozzles 17 disposed at opposite sides of the respective portion of the path 3 and serving to direct jets of hot air or another gaseous fluid to continue with the deicing operation or to effect a deicing operation if the device 16 is omitted or deactivated, a mechanical deicing or defrosting device 18 with two motor-driven rotary cylindrical brushes 18a at opposite sides of the respective portion of the path 3, a second pair of nozzles 17 downstream of the brushes 18a, a drying device 19 wherein successive increments of the web 3a are dried before they enter a cooling device 21 serving to render the web 3a more susceptible to collection of moisture during travel along the portions 3A and 3B of the path 3. The upper marginal portion of the web 3a is connected to a so-called transversely jointed chain 24 which is trained over suitable sprocket wheels on the upper end portions of the pulleys 7-9, 11-12 to advance the web along its endless path. The sprocket wheel (not specifically shown) at the top of the pulley 7 can receive torque from the toothed belt 13 of the conveyor means for the web 3a.

The operation is as follows:

The flow L of air can be induced by a fan, not shown, and such flow passes first through that portion of the advancing web 3a which travels in the direction of arrow 6 along the portion 3A of the path 3. The web 3a collects a certain percentage of moisture and the flow L thereupon passes through the web in the path portion 3B (where the web advances in the direction of arrow 4). This results in collection of additional moisture so that the relatively or completely dry flow L thereupon enters the inlet 2a to be cooled in the evaporator 2 and to issue at 22. As a rule, moisture which is collected by the web 3a deposits thereon in the form of frost. Such frost is removed by the devices of the regenerating unit 14 in that successive increments of the running web 3a undergo a heating action in the chamber of the heating device 16 to thus ensure that a certain percentage at least of frost is segregated from the web 3a. Successive increments of the web 3a then pass between the nozzles 17 intermediate the pulley 12 and the brushes 18a whereby the jets of hot air or another gaseous fluid further reduce the accumulation (if any) of frost before the increments of the web advance into the range of the mechanical defrosting or deicing device 18 whose brushes 18a act upon the respective sides of the web ahead of the second pair of nozzles 17. Successive increments of the web 3a are completely dried in the device 19 and are thereupon cooled at 21 prior to reentering the portion 3B of the path 3. This ensures that the web 3a can always collect large quantities of moisture because the regeneration is completed during travel of successive increments along the path portion 3C.

It is clear that the regenerating unit 14 can be simplified and/or modified in a number of ways without departing from the spirit of the invention. For example, it is often sufficient to employ a single deicing or defrosting device in conjunction with the cooling device 21 or one or at most two deicing or defrosting devices, the drying device 19 and the cooling device 21. It is equally possible to provide a large number of deicing devices and to activate only one or two or less than all deicing devices if the moisture content of the flow L does not warrant or necessitate the use of all deicing or defrosting devices. A relatively simple regenerating unit will comprise the melting or heating device 16, the drying device 19 and the cooling device 21. Alternatively, the regenerating unit will employ only the mechanical deicing or defrosting brushes 18a (or analogous mechanical ice- and frost-removing means), the drying device 19 and the cooling device 21. The utilization of mechanical removing means without any melting of deposits of ice and/or frost is satisfactory when the accumulations of frozen moisture on the web 3a are relatively small. In fact, even the cooling device 21 can be omitted if the web 3a is acted upon only by rotary brushes (such as the brushes 18a) and/or by one or more jets of gaseous fluid which can be cooled to ensure that the temperature of those increments of the web 3a which reenter the path portion 3A will be adequately cooled for accumulation of relatively large quantities of moisture thereon. The nozzles 17 immediately downstream of the melting device 16 can serve solely as a means for blowing away droplets of water which develop as a result of heating in 16 and/or for blowing away loose parts of the coating of frost and/or ice. This can obviate the need for a discrete heating device 19 or at least simplifies the task of the device 19.

Figure 3:
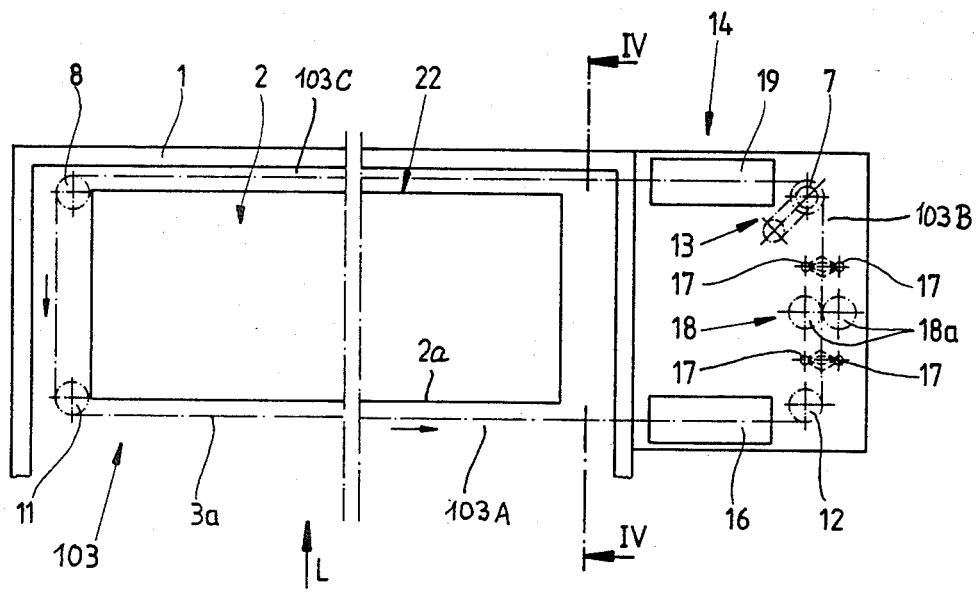
FIG. 3 is a schematic plan view of a refrigeration system which is equipped with a deicing or defrosting apparatus embodying another form of the invention and having a regenerating unit which need not employ a discrete cooling device for the moisture collecting body.
Figure 4:
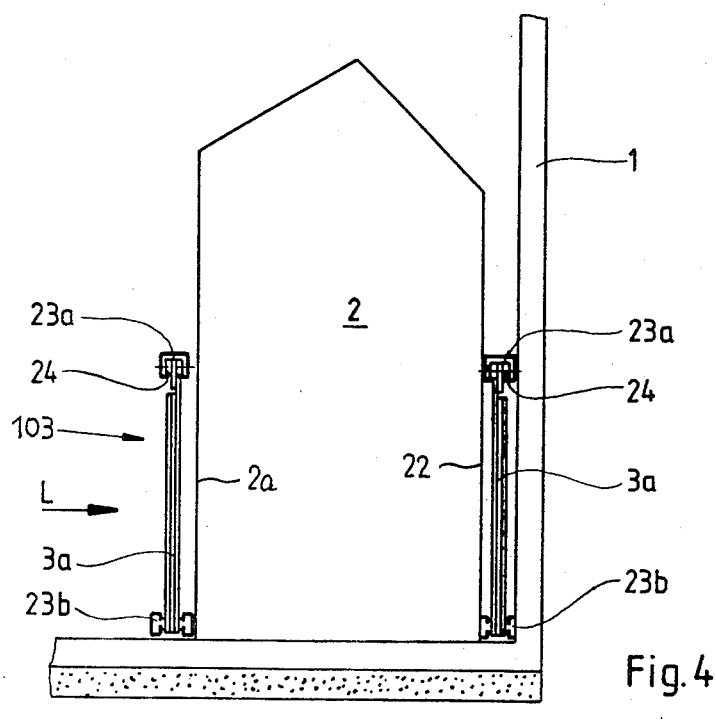
FIG. 4 is a vertical sectional view as seen in the direction of arrows from the line IV—IV of FIG. 3.

FIGS. 3 and 4 show a portion of a modified refrigeration system wherein all such parts which are identical with or clearly analogous to the corresponding parts of the system of FIGS. 1 and 2 are denoted by similar reference characters. The path 103 for the endless air-permeable moisture-collecting body or web 3a is different from the path 3 because it includes a first portion 103A in front of the inlet 2a of the evaporator 2, a second portion 103B in the region of the regenerating unit 14, and a third portion 103C behind the outlet 22 of the evaporator so that the cooling device 21 of FIG. 1 can be omitted, the dried increments of the web 3a being cooled by the flow which issues from the evaporator 2.

If desired or necessary, the web 3a can be made of capillary tubes which contain a supply of circulating coolant such as air, Freon, ammonia or the like. This obviates the need for a cooling device or even for the guidance of the web along the outlet 22 of the evaporator 2 because the capillaries of the web are always cooled. The cooling action is especially satisfactory if the regenerating unit of the refrigeration system which embodies such a web does not employ any means for heating the web, i.e., if the deicing or defrosting means merely comprises mechanical components and/or nozzles which blow cool atmospheric air or another gaseous fluid.

The web 3a can be advanced continuously or intermittently. Continuous transport of the web is preferred because this even further reduces the likelihood of deposition of any ice or frost on the evaporator 2 or premature icing or frosting of the evaporator. Moreover, a continuously moving web is less likely to gather substantial quantities of ice or frost per unit area so that the regenerating operation can be carried out with a higher degree of reliability and at a lower cost.

An advantage of the improved method and apparatus is that the intervals of efficient operation of the refrigeration system are much longer than the intervals of proper operation of systems wherein the evaporator is shielded from excessive or premature icing and frosting in the aforedescribed conventional ways. Moreover, the evaporator is shielded from rapid accumulations of ice or frost in an automatic way so that it is not necessary to monitor the operation of the refrigeration system. Still further, it is not necessary to manually remove the moisture collecting means, and a single web 3a or another suitable air-permeable moisture-collecting body can be used as long as desired. In addition, the apparatus is compact and can be installed in existing refrigeration systems at a reasonable cost.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of checking the icing of the evaporator for refrigerant in a refrigeration system wherein the evaporator has inlet means for admission of a flow of atmospheric air and such air normally contains moisture, comprising the steps of repeatedly conveying across the flow of atmospheric air in front of the inlet means of the evaporator a moisture-collecting air-permeable body which collects at least some moisture from the flow while the flow passes therethrough and into the inlet means whereby the collected moisture tends to freeze on the body; and repeatedly regenerating the moisture-laden body.

2. The method of claim 1, wherein said conveying step includes advancing the body along an endless path having a first portion in front of the inlet means of the evaporator and at least one second portion downstream of the first portion, said regenerating step being carried out in the second portion of said path.

3. The method of claim 1, wherein said regenerating step includes defrosting and cooling the body.

4. The method of claim 1, wherein said regenerating step includes drying and cooling the body.

5. The method of claim 1, wherein said regenerating step includes melting frozen moisture off the body.

6. The method of claim 1, wherein said regenerating step includes mechanically segregating moisture from the body.

7. The method of claim 1 of checking the icing of the evaporator for refrigerant in a refrigeration system wherein the evaporator has inlet means for admission of a first flow of atmospheric air and outlet means for evacuation of a second flow of cooled air, wherein said conveying step includes advancing the body along an endless path a first portion of which extends across the first flow, a second portion of which is located downstream of the first portion and a third portion of which is located downstream of the second portion but upstream of the first portion and extends across the second flow, said regenerating step including segregating collected moisture from the body in the second portion and cooling the body in the third portion of the path.

8. The method of claim 1, wherein the body is an endless web with interstices permitting the flow of air through the web and into the inlet means of the evaporator.

9. In a refrigerating system, the combination of an evaporator for refrigerant, said evaporator having inlet means for admission of a flow of atmospheric air which normally contains moisture tending to cause icing of the evaporator; and means for checking the icing of the evaporator, comprising an air-permeable moisture-collecting body, said body being movable relative to said evaporator across the flow in front of said inlet means whereby the body collects at least some moisture from the flow while the flow passes therethrough and into the inlet means and the collected moisture tends to freeze on the body, and means for regenerating the moisture-laden body, said regenerating means being spaced apart from said inlet means.

10. The combination of claim 9, wherein said body includes a web of foraminous material.

11. The combination of claim 10, wherein said web includes a fine wire screen.

12. In a refrigerating system, the combination of an evaporator for refrigerant, said evaporator having inlet means for admission of a flow of atmospheric air which normally contains moisture tending to cause icing of the evaporator; and means for checking the icing of the evaporator, comprising an air-permeable moisture-collecting body, said body being movable across the flow in front of said inlet means whereby the body collects at least some moisture from the flow while the flow passes therethrough and into the inlet means and the collected moisture tends to freeze on the body, conveyor means for advancing the body along an endless path having a first portion in front of said inlet means and a second portion between said first portion and said inlet means so that the flow of atmospheric air first penetrates across the body in the first portion and thereupon again penetrates through the body in the second portion of said path, and means for regenerating the mositure-laden body.

13. In a refrigerating system, the combination of an evaporator for refrigerant, said evaporator having inlet means for admission of a flow of atmospheric air which normally contains moisture tending to cause icing of the evaporator and outlet means for evacuation of cooled flow of atmospheric air; and means for checking the icing of the evaporator, comprising an air-permeable moisture-collecting body, said body being movable across the flow in front of said inlet means whereby the body collects at least some moisture from the flow while the flow passes therethrough and into the inlet means and the collected moisture tends to freeze on the body, means for advancing said body along an endless path having a first portion in front of said inlet means wherein the flow of air is relieved of at least some moisture while passing through said body and a second portion behind said outlet means wherein the body is cooled ahead of said first portion, and means for regenerating the moisture-laden body.

14. The combination of claim 9, wherein said regenerating means includes means for melting frozen moisture off said body.

15. The combination of claim 9, wherein said regenerating means includes means for mechanically removing moisture from said body.

16. The combination of claim 15, wherein said removing means includes at least one brush.

17. The combination of claim 9, wherein said regenerating means includes means for directing against the body at least one jet of compressed gaseous fluid which removes moisture from the body.

18. The combination of claim 9, wherein said regenerating means comprises means for removing at least some moisture from the body and means for thereupon drying the body.

19. The combination of claim 18, wherein said regenerating means further comprises means for cooling the dried body 20. The combination of claim 9, further comprising means for advancing said body along an endless path including a first portion in front of said inlet means and a second portion downstream of said first portion, said regenerating means including a succession of components adjacent the second portion of said path and arranged to act upon the moving body one after the other.

21. In a refrigerating system, the combination of an evaporator for refrigerant, said evaporator having inlet means for admission of a flow of atmospheric air which normally contains moisture tending to cause icing of the evaporator; and means for checking the icing of the evaporator, comprising an air-permeable moisture-collecting body includinga web of foraminous material, said body being movable across the flow in front of said inlet means whereby the body collects at least some moisture from the flow while the flow passes therethrough and into the inlet means and the collected moisture tends to freeze on the body, means for advancing the web along an endless path including a first portion in front of said inlet means and a second portion downstream of said first portion, and means for regenerating the moisture-laden body including means for mechanically removing moisture from the body, said removing means including at least one pair of rotary brushes adjacent the second portion of said path at opposite sides of said web.

22. In a refrigerating system, the combination of an evaporator for refrigerant, said evaporator having inlet means for admission of a flow of atmospheric air which normally contains moisture tending to cause icing of the evaporator; and means for checking the icing of the evaporator, comprising an air-permeable moisture-collecting body, said body being movable across the flow in front of said inlet means whereby the body collects at least some moisture from the flow while the flow passes therethrough and into said inlet means, means for advancing the body along an endless path having a portion in front of said inlet means, means for guiding the body in said path, and means for regenerating the moisture-laden body.

23. The combination of claim 12, wherein said path further includes a third portion and said regenerating means comprises means for cooling the body in the third portion of said path.

24. The combination of claim 22, wherein said means for guiding comprises at least one elongated rail and said advancing means includes at least one chain which is ocnnected to said body and is guided by said rail.

25. A method of checking the icing of the evaporator for refrigerant in a refrigeration system wherein the evaporator has inlet means for admission of a flow of atmospheric air and such air normally contains moisture, comprising the steps of conveying across the flow of atmospheric air in front of the inlet means of the evaporator a moisture-collecting air-permeable body which collects at least some moisture from the flow while the flow passes therethrough and into the inlet means whereby the collected moisture tends to freeze on the body, said conveying step including advancing the body along an endless path having a first portion in front of the inlet means of the evaporator and at least one second portion downstream of the first portion; and regenerating the moisture-laden body in the second portion of said path.

26. In a refrigerating system, the combination of an evaporator for refrigerant, said evaporator having inlet means for admission of a flow of atmosopheric air which normally contains moisture tending to cause icing of the evaporator; and means for checking the icing of the evaporator, comprising an air-permeable moisture-collecting body, said body being movable across the flow in front of said inlet means whereby the body collects at least some moisture from the flow while the flow passes therethrough and into the inlet means and the collected moisture tends to freeze on the body, conveyor means for advancing the body along an endless path having a first portion in front of said inlet means and a second portion, and means for regenerating the moisture-laden body adjacent the second portion of said path.

* * * * *